United States Patent
Minor et al.

(10) Patent No.: US 6,822,829 B2
(45) Date of Patent: *Nov. 23, 2004

(54) PERPENDICULAR MAGNETIC RECORDING HEAD WITH A MULTILAYERED MAIN WRITE POLE

(75) Inventors: Michael K. Minor, Gibsonia, AZ (US); Timothy J. Klemmer, Sharpsburg, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 143 days.

This patent is subject to a terminal disclaimer.

(21) Appl. No.: 10/079,684

(22) Filed: Feb. 20, 2002

(65) Prior Publication Data

US 2003/0076627 A1 Apr. 24, 2003

Related U.S. Application Data

(60) Provisional application No. 60/344,929, filed on Oct. 19, 2001.

(51) Int. Cl.[7] .......................... G11B 5/127; G11B 5/23; G11B 5/30
(52) U.S. Cl. ...................................... 360/125
(58) Field of Search ................ 360/125, 126, 360/123; 29/603.11, 603.14

(56) References Cited

U.S. PATENT DOCUMENTS

| | | | |
|---|---|---|---|
| 4,423,450 A | * | 12/1983 | Hamilton ..................... 360/111 |
| 4,441,131 A | * | 4/1984 | Osanai ........................ 360/119 |
| 4,541,026 A | | 9/1985 | Bonin et al. |
| 4,575,777 A | * | 3/1986 | Hosokawa .................. 360/123 |
| 4,639,810 A | | 1/1987 | Sakai |
| 4,672,494 A | * | 6/1987 | Furuya et al. .............. 360/125 |
| 4,762,755 A | * | 8/1988 | Shiiki et al. ................ 428/635 |
| 4,873,599 A | * | 10/1989 | Sueoka ........................ 360/126 |
| 5,111,352 A | * | 5/1992 | Das et al. .................... 360/321 |
| 5,161,299 A | | 11/1992 | Denison et al. |
| 5,208,714 A | | 5/1993 | Denison et al. |
| 5,439,754 A | | 8/1995 | Iwasaki et al. |
| 5,606,478 A | | 2/1997 | Chen et al. |
| 5,640,753 A | | 6/1997 | Schultz et al. |
| 5,668,689 A | | 9/1997 | Schultz et al. |
| 5,777,828 A | | 7/1998 | Kameyama et al. |
| 5,812,337 A | * | 9/1998 | Tanaka et al. ........... 360/73.12 |
| 5,812,350 A | | 9/1998 | Chen et al. |
| 5,864,450 A | | 1/1999 | Chen et al. |
| 5,920,979 A | | 7/1999 | Nepela et al. |
| 6,033,792 A | | 3/2000 | Kirino et al. |
| 6,063,512 A | | 5/2000 | Osaka et al. |
| 6,296,955 B1 | * | 10/2001 | Hossain et al. ............. 428/692 |
| 6,317,290 B1 | | 11/2001 | Wang et al. |

FOREIGN PATENT DOCUMENTS

| | | | | |
|---|---|---|---|---|
| EP | 0301823 A | | 2/1989 | |
| JP | 61129710 A | | 6/1986 | |
| JP | 63-144403 | * | 6/1988 | ........... G11B/5/265 |
| JP | 02029904 A | | 1/1990 | |
| JP | 02216604 A | * | 8/1990 | ............. G11B/5/23 |

* cited by examiner

Primary Examiner—George J. Letscher
Assistant Examiner—Christopher R. Magee
(74) Attorney, Agent, or Firm—Benjamin T. Queen, II; Pietragallo, Bosick & Gordon

(57) ABSTRACT

A perpendicular magnetic recording head includes a multi-layered main write pole. The main write pole includes a first layer of material, a second layer of material, and an interlayer positioned between the first layer of material and the second layer of material. The second layer of material has a saturation magnetic moment greater than a saturation magnetic moment of the first layer of material.

24 Claims, 7 Drawing Sheets

PERPENDICULAR MAGNETIC RECORDING HEAD WITH A MULTILAYERED MAIN WRITE POLE

CROSS REFERENCE TO RELATED APPLICATION

This application claims the benefit of U.S. Provisional Application No. 60/344,929 filed Oct. 19, 2001.

FIELD OF THE INVENTION

The invention relates to perpendicular magnetic recording heads, and more particularly, to a perpendicular magnetic recording head with a multilayered main write pole.

BACKGROUND OF THE INVENTION

Magnetic recording heads have utility for use in a magnetic disc drive storage system. Most magnetic recording heads used in such systems today are "longitudinal" magnetic recording heads. Longitudinal magnetic recording in its conventional form has been projected to suffer from superparamagnetic instabilities at densities above approximately 40 Gbit/in$^2$. It is believed that reducing or changing the bit cell aspect ratio will extend this limit up to approximately 100 Gbit/in$^2$. However, for recording densities above 100 Gbit/in$^2$, different approaches will likely be necessary to overcome the limitations of longitudinal magnetic recording.

An alternative to longitudinal recording is "perpendicular" magnetic recording. Perpendicular magnetic recording is believed to have the capability of extending recording densities well beyond the limits of longitudinal magnetic recording. Perpendicular magnetic recording heads for use with a perpendicular magnetic storage medium may include a pair of magnetically coupled poles, including a main write pole having a relatively small bottom surface area and a flux return pole having a larger bottom surface area. A coil having a plurality of turns is located adjacent to the main write pole for inducing a magnetic field between that pole and a soft underlayer of the storage media. The soft underlayer is located below the hard magnetic recording layer of the storage media and enhances the amplitude of the field produced by the main pole. This, in turn, allows the use of storage media with higher coercive force, consequently, more stable bits can be stored in the media. In the recording process, an electrical current in the coil energizes the main pole, which produces a magnetic field. The image of this field is produced in the soft underlayer to enhance the field strength produced in the magnetic media. The flux density that diverges from the tip into the soft underlayer returns through the return flux pole. The return pole is located sufficiently far apart from the main write pole such that the material of the return pole does not affect the magnetic flux of the main write pole, which is directed vertically into the hard layer and the soft underlayer of the storage media.

A perpendicular magnetic recording system may utilize a main write pole having uniform magnetic properties, i.e. the main write pole is formed of a single material having a uniform magnetic moment. However, such a write pole can exhibit skew effects which can degrade adjacent tracks.

Perpendicular magnetic recording systems alternatively may utilize a main write pole having a "hybrid" design wherein, for example, a high saturation magnetic moment material is formed on top of a low saturation magnetic moment material. This type of design has been found effective in, for example, reducing skew effects during the writing process. However, it has been determined that for such a hybrid design, the low saturation magnetic moment material may induce a texture in the high saturation magnetic moment material which may impact the desired magnetic properties of the head design, such as an increase in the magnetic remanence.

Accordingly, there is identified a need for an improved perpendicular magnetic recording head that overcomes limitations, disadvantages, and/or shortcomings of known perpendicular magnetic recording heads. In addition, there is identified a need for an improved main write pole of a perpendicular magnetic recording head that overcomes limitations, disadvantages, and/or shortcomings of known main write poles.

SUMMARY OF THE INVENTION

Embodiments of the invention meet the identified needs, as well as other needs, as will be more fully understood following a review of the specification and drawings.

In accordance with an aspect of the invention, a main write pole for a perpendicular magnetic recording head comprises a first layer of material, a second layer of material, and an interlayer positioned between the first and second layers of material. The second layer of material has a saturation magnetic moment that is greater than a saturation magnetic moment of the first layer of material. The interlayer may include, for example, $Al_2O_3$, $SiO_2$, $Si_3N_4$ and/or any material which is amorphous or has little or no lattice matching with the magnetic layers. The first layer of material is magnetically exchanged coupled to the second layer of material through the interlayer. This results in formation of a main write pole having soft and uniaxial magnetic properties and a relatively low hard axis remanence.

In accordance with an additional aspect of the invention, a perpendicular magnetic recording head comprises a main write pole and a return pole magnetically coupled to the main write pole. The main write pole comprises a first layer of material, a second layer of material, and an interlayer positioned between the first layer of material and the second layer of material. The second layer of material has a greater saturation magnetic moment than the first layer of material.

In accordance with yet another aspect of the invention, a magnetic disc drive storage system comprises a housing, a perpendicular magnetic recording medium positioned in the housing, and a perpendicular magnetic recording head mounted in the housing adjacent the magnetic recording medium. The magnetic recording head includes a main write pole and a return pole magnetically coupled to the write pole. The main write pole includes a first layer of material, a second layer of material, and an interlayer positioned between the first layer of material and the second layer of material to magnetically exchange couple the first and second layers of material. The second layer of material has a greater saturation magnetic moment than the first layer of material.

DETAILED DESCRIPTION OF THE INVENTION

The invention provides a perpendicular magnetic recording head, and more particularly a perpendicular magnetic recording head with a multilayered main write pole. The invention is particularly suitable for use with a magnetic disc drive storage system. A recording head, as used herein, is generally defined as a head capable of performing read and/or write operations. Perpendicular magnetic recording, as used herein, generally refers to orienting magnetic domains within a magnetic storage medium substantially perpendicular to the direction of travel of the recording head and/or recording medium.

Figure 1:
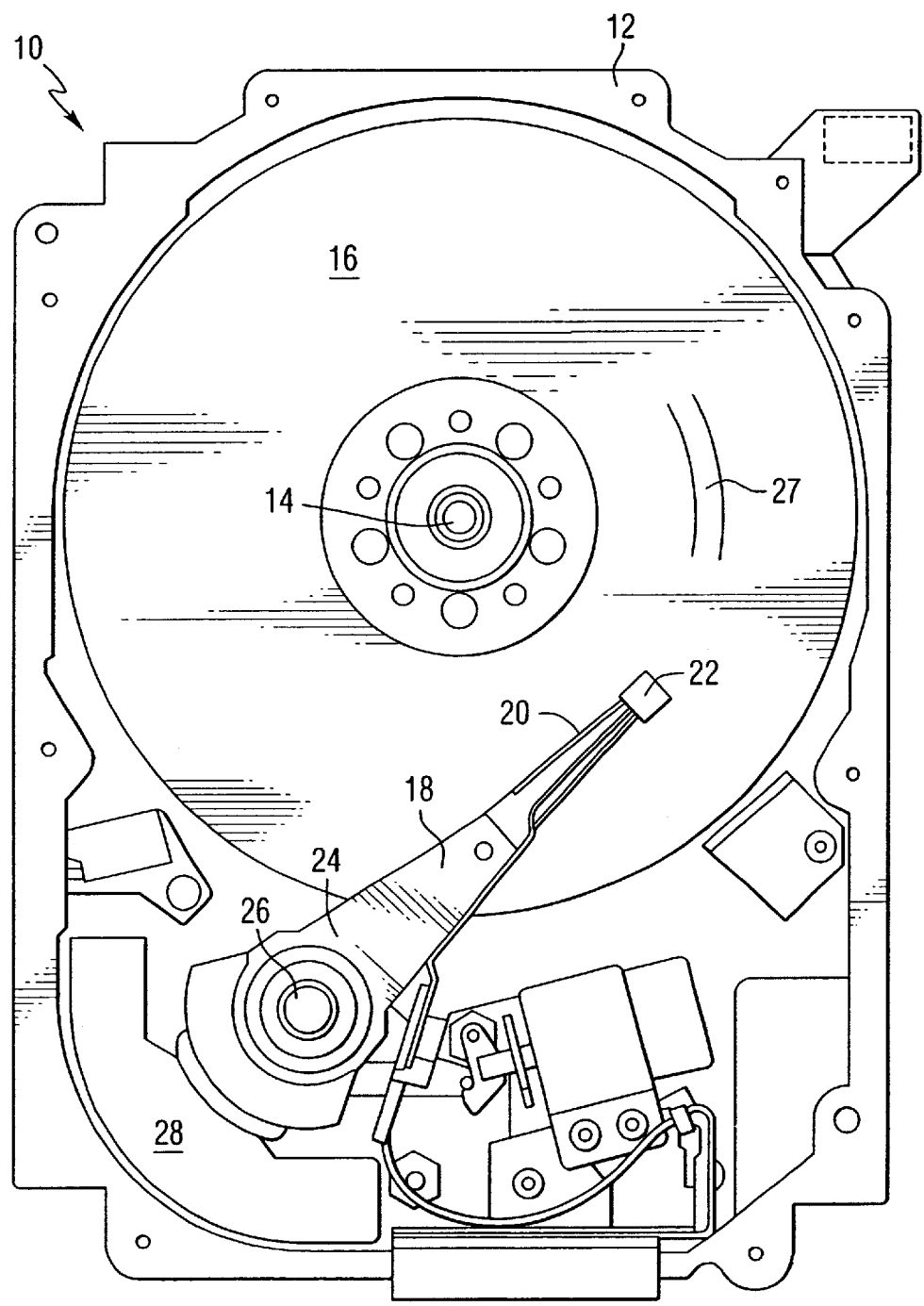
FIG. 1 is a pictorial representation of a disc drive system that may utilize a perpendicular magnetic recording head in accordance with the invention.

FIG. 1 is a pictorial representation of a disc drive 10 that can utilize a perpendicular magnetic recording head in accordance with this invention. The disc drive 10 includes a housing 12 (with the upper portion removed and the lower portion visible in this view) sized and configured to contain the various components of the disc drive. The disc drive 10 includes a spindle motor 14 for rotating at least one magnetic storage medium 16, which may be a perpendicular magnetic recording medium, within the housing, in this case a magnetic disc. At least one arm 18 is contained within the housing 12, with each arm 18 having a first end 20 with a recording head or slider 22, and a second end 24 pivotally mounted on a shaft by a bearing 26. An actuator motor 28 is located at the arm's second end 24 for pivoting the arm 18 to position the recording head 22 over a desired sector or track 27 of the disc 16. The actuator motor 28 is regulated by a controller, which is not shown in this view and is well known in the art.

Figure 2:
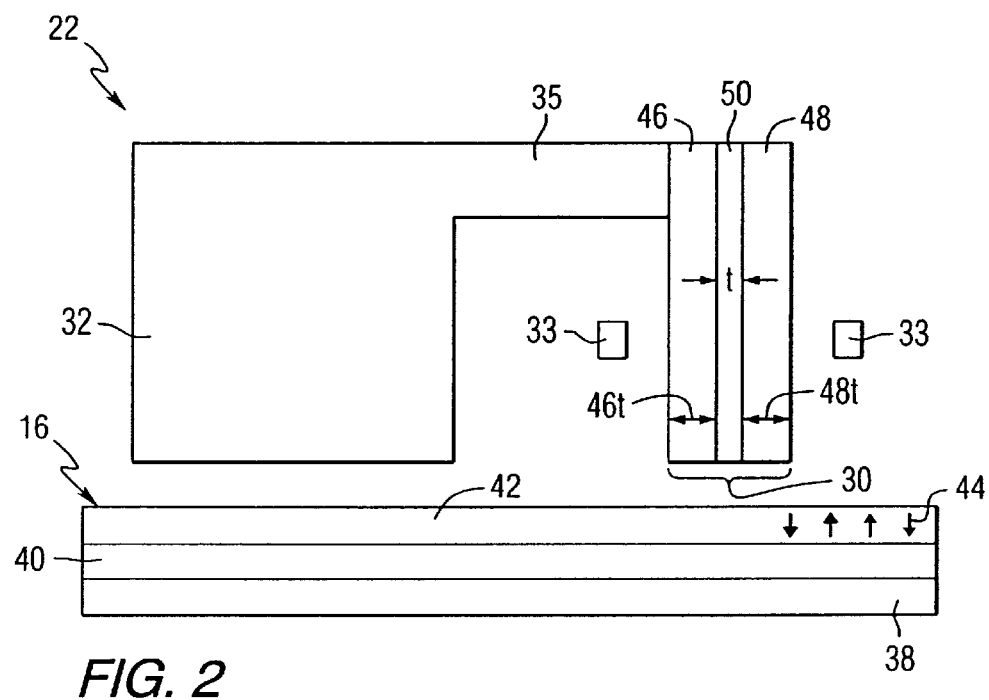
FIG. 2 is a partially schematic side view of a perpendicular magnetic recording head and a perpendicular magnetic recording medium in accordance with the invention.

FIG. 2 is a partially schematic side view of the perpendicular magnetic recording head 22 and the perpendicular recording magnetic medium 16. Specifically, the recording head 22 includes a writer section comprising a main write pole 30 and a return or opposing pole 32 that are magnetically coupled by a yoke or pedestal 35. A magnetizing coil 33 surrounds the yoke or pedestal 35 for energizing the recording head 22. The recording head 22 also includes a read head, not shown, which may be any conventional type read head as is generally known in the art.

Still referring to FIG. 2, the perpendicular magnetic recording medium 16 is positioned under the recording head 22. The recording medium 16 includes a substrate 38, which may be made of any suitable material such as ceramic glass or amorphous glass. A soft magnetic underlayer 40 is deposited on the substrate 38. The soft magnetic underlayer 40 may be made of any suitable material having, for example, a relatively high moment and high permeability. A hard magnetic recording layer 42 is deposited on the soft underlayer 40, with the perpendicular oriented magnetic domains 44 contained in the hard layer 42. Suitable hard magnetic materials for the hard magnetic recording layer 42 may include at least one material selected from CoCr, FePd, CoPd, CoFePd, CoCrPd, or CoCrPt.

In accordance with the invention, the main write pole 30 is a multilayered structure. Specifically, the main write pole 30 includes a first layer 46, a second layer 48, and an interlayer 50 positioned between the first layer 46 and the second layer 48. The first layer 46 is magnetically exchange coupled to the second layer 48 through the interlayer 50. The first layer 46 of the main write pole 30 may be formed of a material, such as, for example, NiFeX, wherein X comprises Cr, Cu, Ti, and/or any material which effectively dilutes the moment of the NiFe while maintaining the magnetic properties of the NiFe. The material for the first layer 46 is selected such that a saturation magnetic moment of the first layer 46 is in the range of about 0.3T to about 0.5T.

The second layer 48 of the main write pole 30 may be formed of a material, such as, for example, FeCo or FeCoX, wherein X comprises B, Zr, Ta, Hf, and/or any material resulting in a grain size refinement which results in a material with soft and uniaxial properties. The material for the second layer 48 is selected such that the second layer 48 has a saturation magnetic moment in the range of about 1.6T to about 2.4T.

The interlayer 50 is formed of a non-magnetic material to serve as insulation between the first layer 46 and the second layer 48. The interlayer 50 may be formed of a material, such as, for example, $Al_2O_3$, $SiO_2$, $Si_3N_4$, and/or any material not having similar lattice constants compared to the materials for the first layer 46 and the second layer 48.

As described herein, a main write pole with a hybrid head design, i.e. a high saturation magnetic moment material formed directly on top of a low saturation magnetic moment material has been found to induce a texture in the layer of high saturation magnetic moment material, which results in harder and less uniaxial magnetic properties in the layer of high saturation magnetic moment material, as well as results in an increase in the magnetic remanence along a hard axis ($M_{rh}$). Accordingly, the interlayer 50 is positioned between the first layer 46 (which has a relatively low saturation magnetic moment) and the second layer 48 (which has a relatively high saturation magnetic moment). Specifically, the interlayer 50, based on, for example, the particular material used and the thickness thereof, will serve to break or minimize the texturing effect that has been found between a high saturation magnetic moment material formed directly on top of a low saturation magnetic moment material. The parameters of the interlayer 50 are also important in ensuring that the first layer 46 remains magnetically exchange coupled to the second layer 48. Accordingly, the interlayer 50 should have a thickness t that is less than a thickness 46t of the first layer 46, as well as less than a thickness 48t of the second layer 48, wherein, for example, 46t and 48t each may be between 500A and 2000A. The thickness t of the interlayer 50 may be in the range of about 5 angstroms to about 20 angstroms. However, it will be appreciated that the thickness t of the interlayer 50 will vary based upon several factors, such as, for example, the particular material selected for the interlayer 50 or the particular materials selected for the first layer 46 and the second layer 48.

Formation of the main write pole 30, as described, results in the main write pole 30 having a $M_{rh}$ in the range of about 0 to about 0.5. This relatively low $M_{rh}$ facilitates, for example, the main write pole 30 not performing a write operation when the recording head 22 is not energized.

To illustrate the invention, reference is made to FIGS. 3–13. Specifically, a main write pole, such as main write pole 30, was formed with the following structure:

Substrate\NiFeCr\tÅ $Al_2O_3$\FeCoB where t=0, 6, 8, 10, 12 and 14.

The NiFeCr material corresponds to the first layer 46 having a relatively low saturation magnetic moment and the FeCoB material corresponds to the second layer 48 material having a relatively high saturation magnetic moment. The $Al_2O_3$ material corresponds to the interlayer 50 and various structures were formed with the $Al_2O_3$ having varying thicknesses. The NiFeCr material had a thickness of 1600 angstroms and the specific composition of 0.46T $(Ni_{80}Fe_{20})_{87}Cr_{13}$. The FeCoB material had a thickness of 1600 angstroms and the specific composition of 2.1T $(Fe_{65}Co_{35})_{91}B_9$. The substrate was formed of Si(100) with 5000 angstroms of thermal oxide. The FeCoB material and the NiFeCr material were deposited via dc magnetron sputtering from targets of the appropriate composition. The $Al_2O_3$ material was deposited via rf magnetron sputtering from an alumina target.

Figure 3:
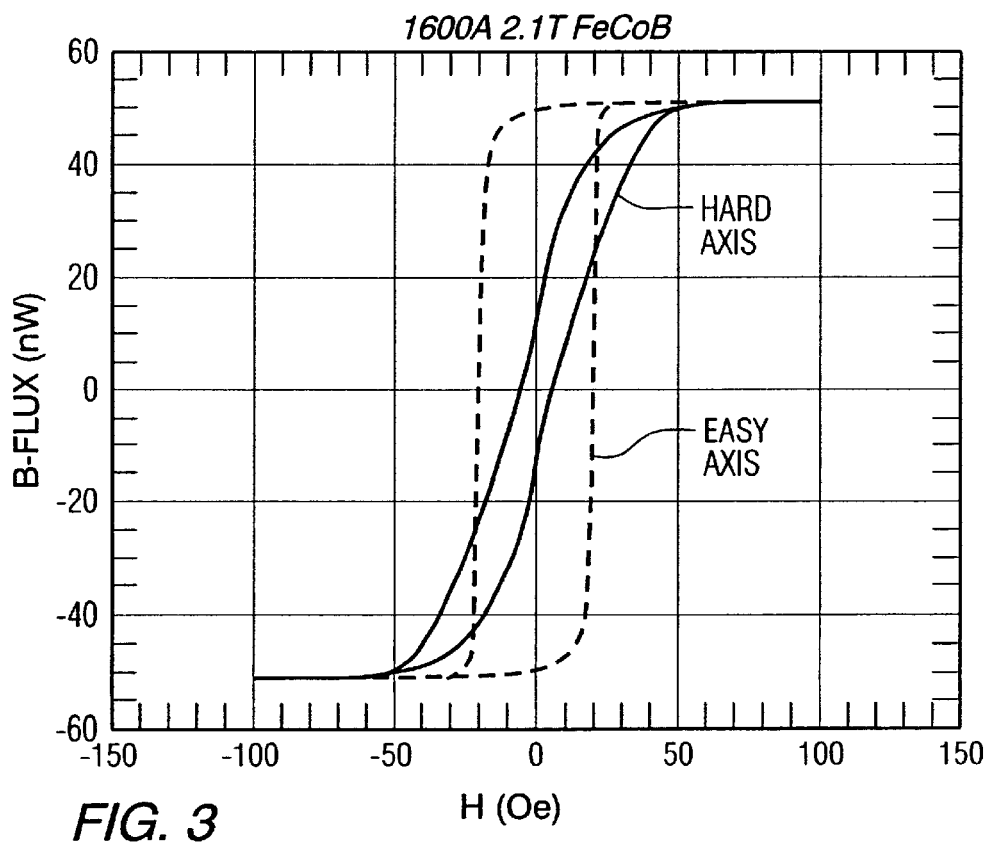
FIG. 3 illustrates B-H loops of a 2.1T FeCoB material having a thickness of 1600 angstroms.

FIG. 3 illustrates B-H loops along the easy axis and the hard axis (as labeled) for the 2.1T FeCoB only. Specifically, the B-H loops indicate that this material has soft and uniaxial magnetic properties for a relatively high saturation magnetic moment and high magnetostriction material. The FeCoB has an easy axis coercivity of approximately 15 Oe, a hard axis coercivity of approximately 10 Oe, and an $H_K$ value of approximately 48 Oe, wherein $H_K$ is the value of an applied field H along the hard axis of the material to reach magnetic saturation. The FeCoB also was determined to have a hard axis squareness, $SQ_h$, of 0.162 (wherein $SQ_h = M_{rh}\backslash M_{sh}$ and wherein $M_{rh}$=the magnetic remanence of the material along the hard axis and $M_{sh}$=the magnetic saturation along the hard axis of the material).

Figure 4:
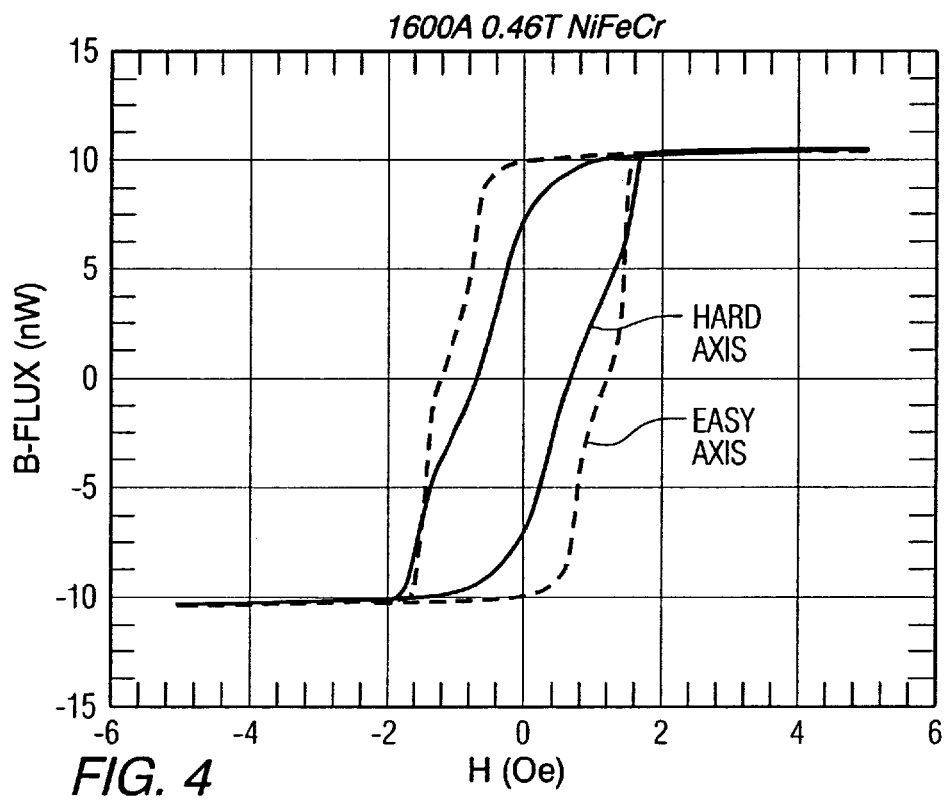
FIG. 4 illustrates B-H loops of a 0.46T NiFeCr material having a thickness of 1600 angstroms.

FIG. 4 illustrates B-H loops along both the easy axis and hard axis for the 0.46T NiFeCr material only. FIG. 4 illustrates that the NiFeCr is a relatively soft material with an easy axis and a hard axis coercivity of less than 1.5 Oe, an $H_K$ of approximately 1.4 Oe, and an $SQ_h$ of 0.643.

Figure 5:
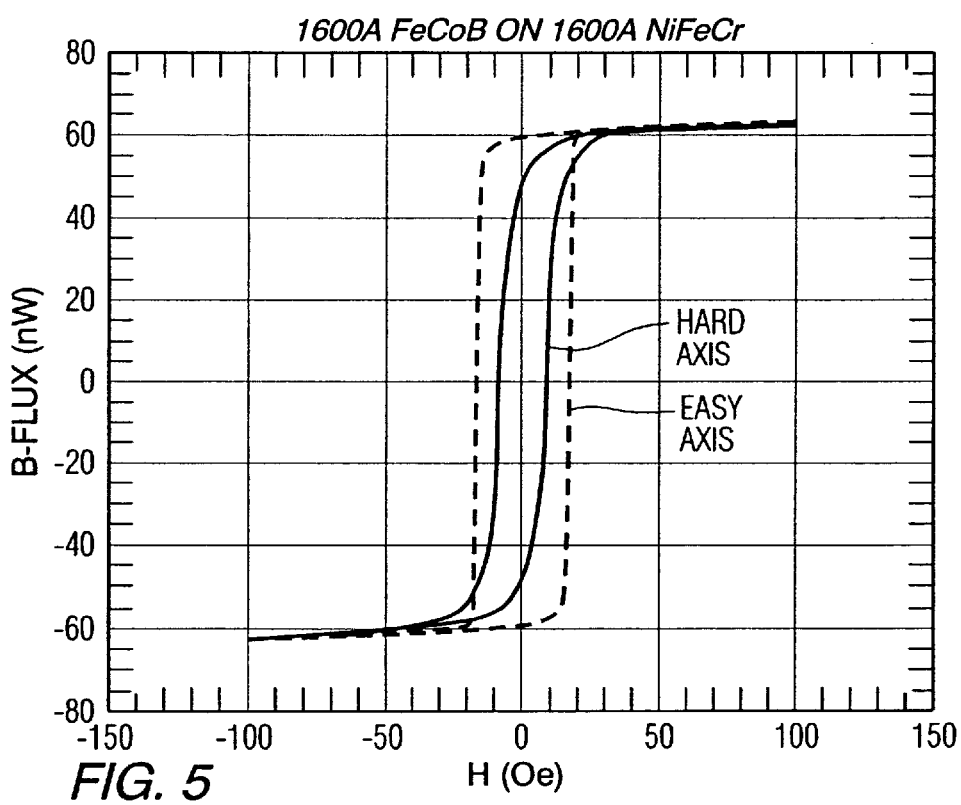
FIG. 5 illustrates B-H loops of the FeCoB material of FIG. 3 as deposited on the NiFeCr material of FIG. 4.

FIG. 5 illustrates B-H loops along both an easy axis and hard axis for the FeCoB material with a thickness of 1600 angstroms deposited directly on top of the NiFeCr material with a thickness of 1600 angstroms. This particular structure results in the "hybrid" design, as described herein, with no interlayer. Specifically, FIG. 5 shows that the NiFeCr and FeCoB are exchanged coupled. However, the $SQ_h$ has increased from 0.162 to 0.752. This increase in $SQ_h$, i.e. an increase in $M_{rh}$, can result in either writing or erasing taking place while the recording head is not energized. It has been determined that this effect is due to a texturing effect in the FeCoB from the NiFeCr. Essentially, the NiFeCr causes an enhancement in the (110) texture of the FeCoB by a factor of approximately 7. In addition, the FeCoB grain size can become larger making the FeCoB film more isotropic as illustrated by FIG. 5.

FIGS. 6–10 illustrate B-H loops along both the easy axis and the hard axis for the structure set forth above where the thickness of the interlayer material $Al_2O_3$=6, 8, 10, 12 and 14 angstroms, respectively.

Figure 11:
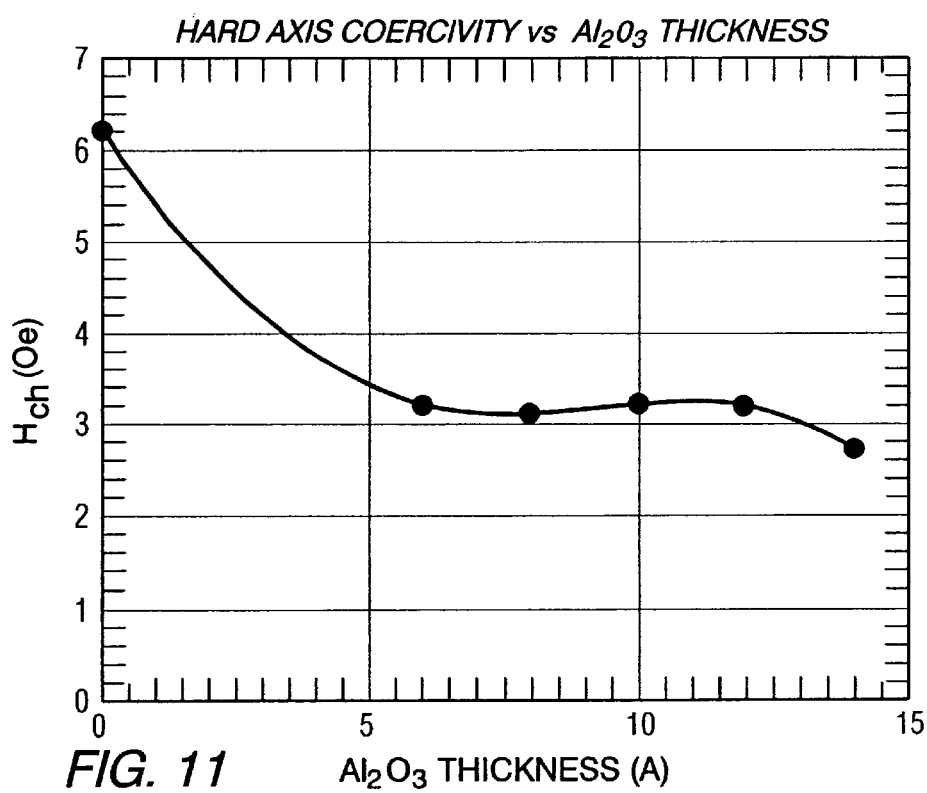
FIG. 11 graphically illustrates the hard axis coercivity, as determined from FIGS. 6–10, versus the $Al_2O_3$ interlayer thickness.
Figure 12:
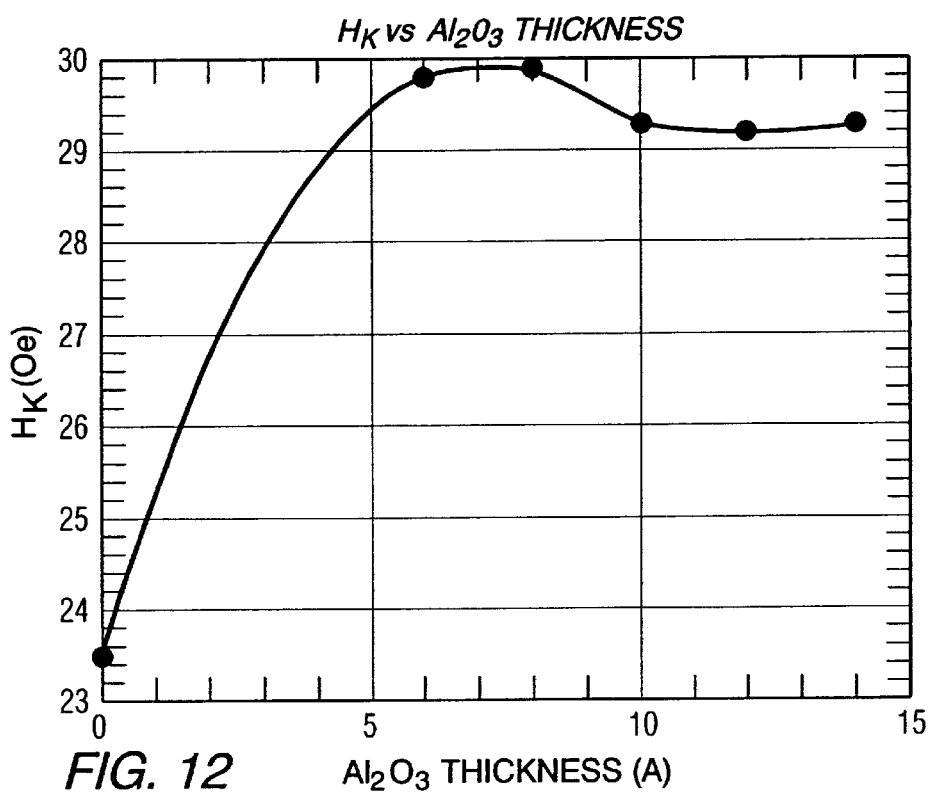
FIG. 12 graphically illustrates $H_K$, as determined from FIGS. 6–10, versus the $Al_2O_3$ interlayer thickness.
Figure 13:
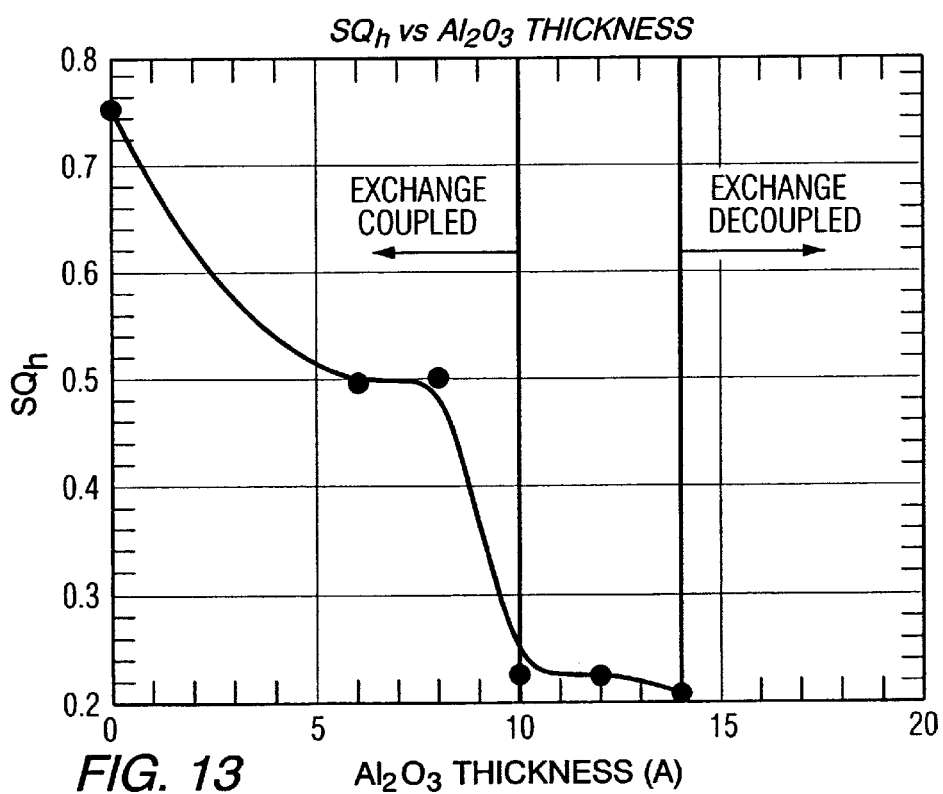
FIG. 13 graphically illustrates $SQ_h$, as determined from FIGS. 6–10, versus the $Al_2O_3$ interlayer thickness.

FIGS. 11–13 illustrate the hard axis coercivity, $H_K$ and $SQ_h$ versus the interlayer $Al_2O_3$ thickness for the main write pole structure 30 constructed in accordance with the invention. These figures illustrate the benefits of using the interlayer 50 between the first layer 46 and the second layer 48 to form the main write pole 30. Specifically, the hard axis coercivity decreases (FIG. 11), $H_K$ increases and becomes relatively constant (FIG. 12), and $SQ_h$ decreases dramatically (FIG. 13). It is noted that the relative descriptions of increasing and/or decreasing is based upon comparative results when there is no interlayer positioned between the materials, i.e. the thickness of the layer of $Al_2O_3$ equals 0. The results illustrated in FIGS. 11–13 are all desirable for efficient write head performance.

Figure 6:
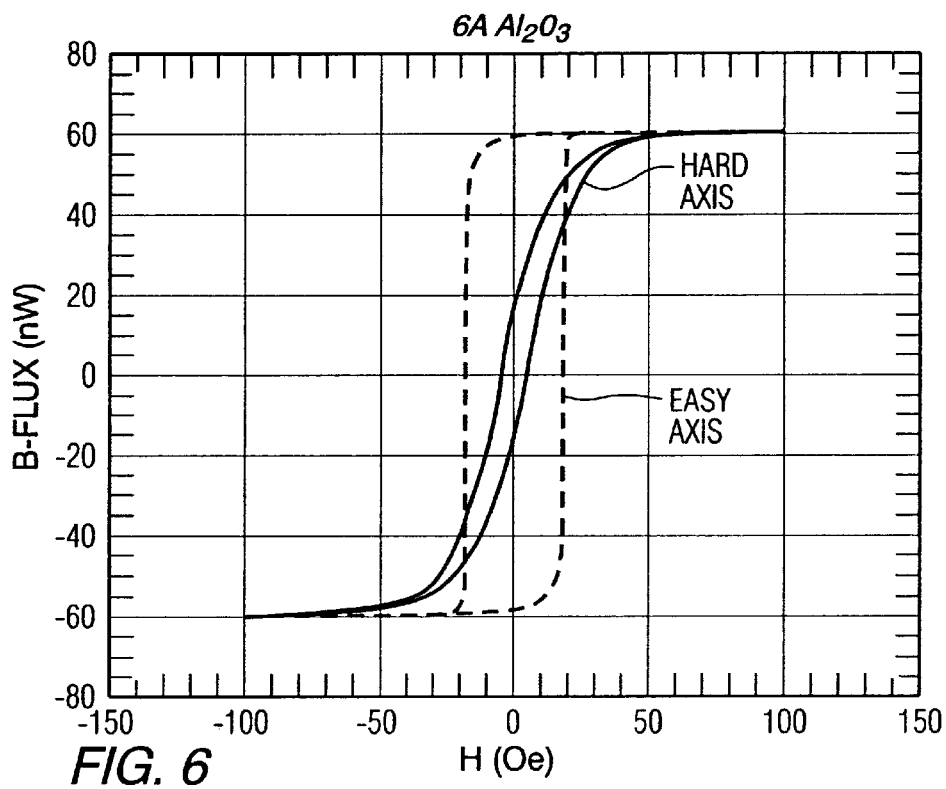
FIG. 6 illustrates B-H loops for a main write pole constructed in accordance with the invention and having an interlayer formed of an $Al_2O_3$ material with a thickness of 6 angstroms.
Figure 7:
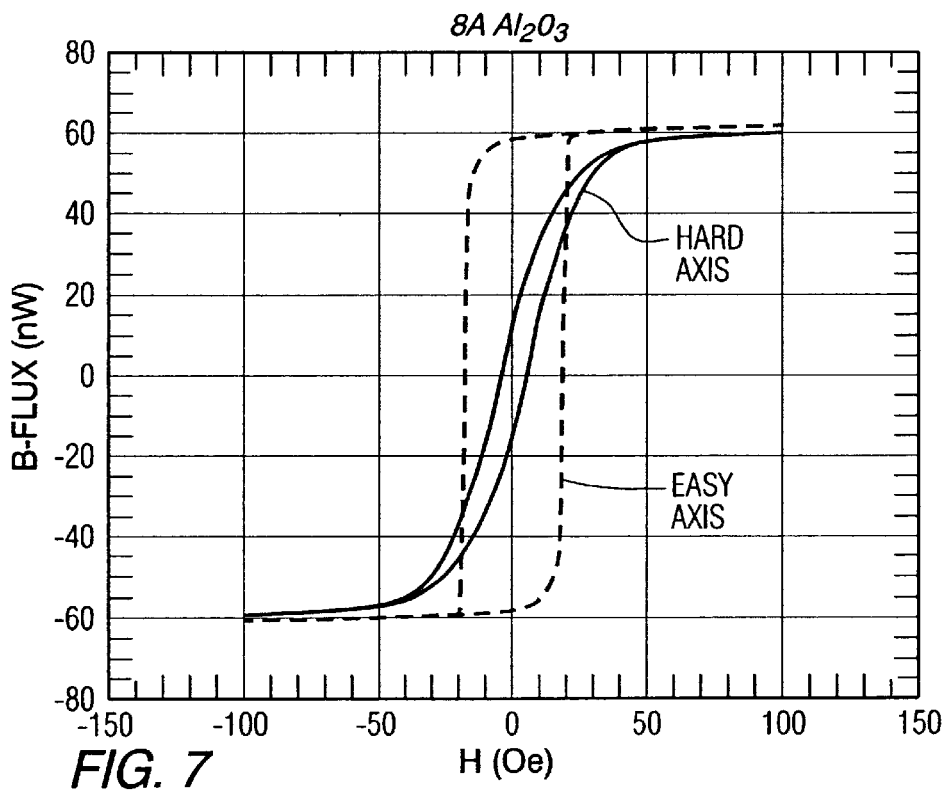
FIG. 7 illustrates B-H loops for a main write pole constructed in accordance with the invention and having an interlayer formed of an $Al_2O_3$ material with a thickness of 8 angstroms.
Figure 8:
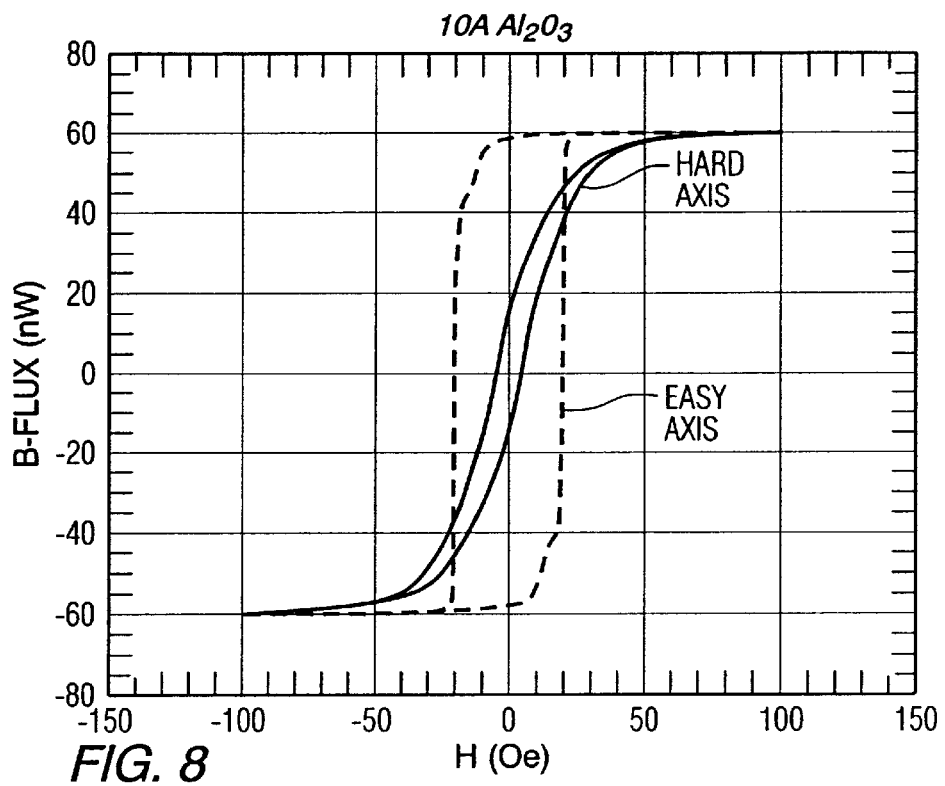
FIG. 8 illustrates B-H loops for a main write pole constructed in accordance with the invention and having an interlayer formed of an $Al_2O_3$ material with a thickness of 10 angstroms.
Figure 9:
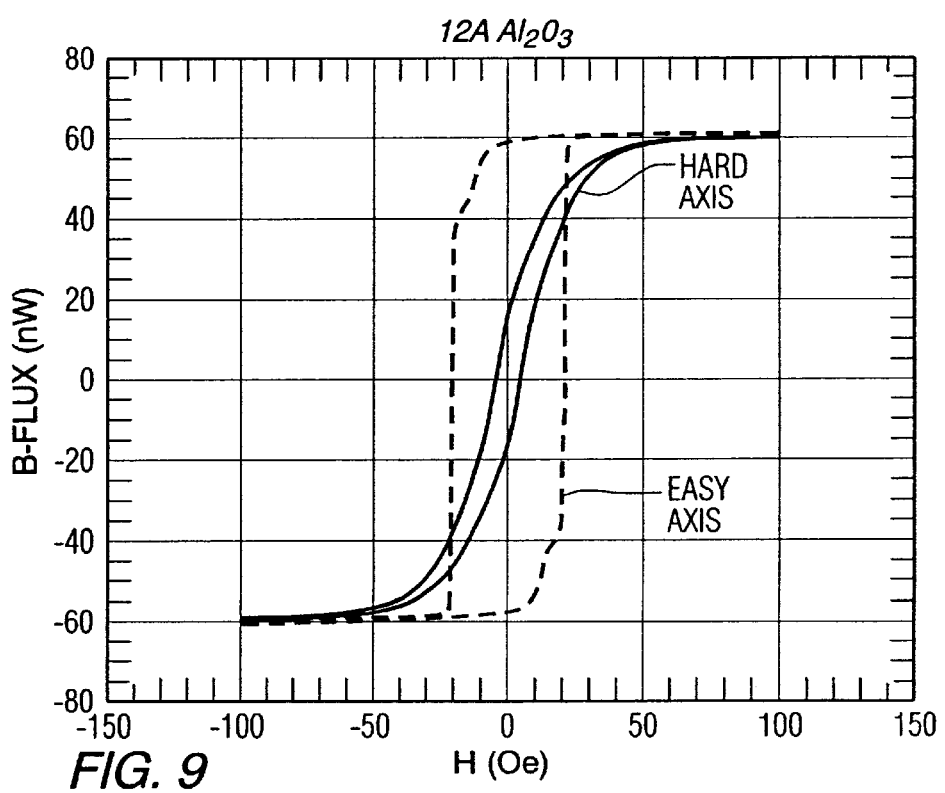
FIG. 9 illustrates B-H loops for a main write pole constructed in accordance with the invention and having an interlayer formed of an $Al_2O_3$ material with a thickness of 12 angstroms.
Figure 10:
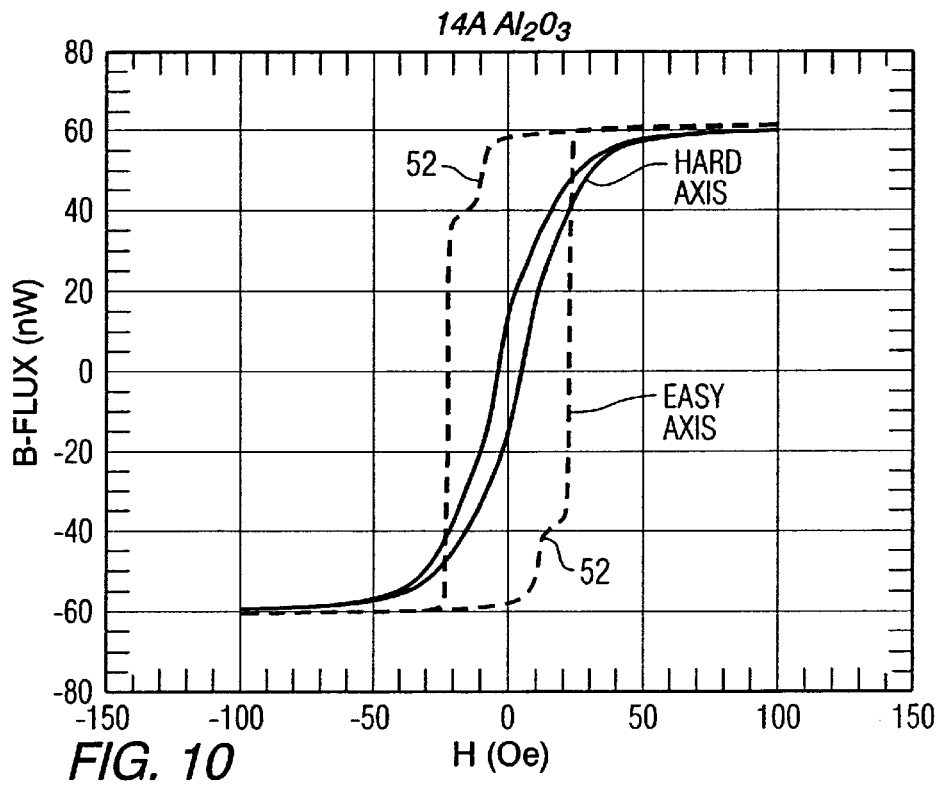
FIG. 10 illustrates B-H loops for a main write pole constructed in accordance with the invention and having an interlayer formed of an $Al_2O_3$ material with a thickness of 14 angstroms.

As described herein, the first layer 46 and second layer 48 must remain magnetically exchanged coupled through the interlayer 50. As illustrated in FIG. 13, the thickness of the interlayer 50 material $Al_2O_3$ is directly related to the required exchange coupling. FIGS. 5–7 clearly show that the NiFeCr and FeCoB are exchange coupled. In contrast, FIG. 10 clearly shows that the NiFeCr and FeCoB are exchanged decoupled, as indicated by the step 52 in the easy axis B-H loop. FIGS. 8 and 9 illustrate a "transition" region in the easy axis loop prior to reaching the full exchange decoupling illustrated by the step 52 in FIG. 10. Therefore, FIG. 13 illustrates that there is a region of $Al_2O_3$ thickness from 10–14 angstroms which is preferred so as to provide minimal $SQ_h$ along with exchange coupling. Therefore, these figures illustrate that selecting the interlayer 50 with a particular thickness can effectively decrease the $M_{rh}$ of the main write pole while allowing the first layer 46 and the second layer 48 to remain exchanged coupled.

Whereas particular embodiments have been described herein for the purpose of illustrating the invention and not for the purpose of limiting the same, it will be appreciated by those of ordinary skill in the art that numerous variations of the details, materials, and arrangement of parts may be made within the principle and scope of the invention without departing from the invention as described in the appended claims.

What is claimed is:

1. A main write pole for a perpendicular magnetic recording head comprising:
   a first layer of material having a first saturation magnetic moment;
   a second layer of material having a second saturation magnetic moment, said second saturation magnetic moment being greater than said first saturation magnetic moment; and
   an interlayer positioned between said first layer of material and said second layer of material.

2. The main write pole of claim 1, wherein said interlayer comprises $Al_2O_3$, $SiO_2$, and/or $Si_3N_4$.

3. The main write pole of claim 1, wherein said interlayer has a thickness in the range of about 5 angstroms to about 20 angstroms.

4. The main write pole of claim 1, wherein a thickness of said interlayer is less than a thickness of said first layer of material.

5. The main write pole of claim 1, wherein a thickness of said interlayer is less than a thickness of said second layer of material.

6. The main write pole of claim 1, wherein said first layer of material is magnetically exchanged coupled to said second layer of material through said interlayer.

7. The main write pole of claim 1, wherein said first layer of material includes NiFeX, wherein X comprises Cr, Cu, and/or Ti.

8. The main write pole of claim 1, wherein said first saturation magnetic moment is in the range of about 0.3T to about 0.5T.

9. The main write pole of claim 1, wherein said second layer of material includes FeCo or FeCoX, wherein X comprises B, Zr, Ta, and/or Hf.

10. The main write pole of claim 1, wherein said second saturation magnetic moment is in the range of about 1.6T to about 2.4T.

11. The main write pole of claim 1, wherein said interlayer is a non-magnetic material.

12. A perpendicular magnetic recording head, comprising:
a main write pole; and
a return pole magnetically coupled to said main write pole,
said main write pole comprising:
a first layer of material having a first saturation magnetic moment;
a second layer of material having a second saturation magnetic moment, said second saturation magnetic moment being greater than said first saturation magnetic moment; and
an interlayer positioned between said first layer of material and said second layer of material.

13. The perpendicular magnetic recording head of claim 12, wherein said main write pole has a hard axis remanence in the range of about 0 to about 0.5.

14. The perpendicular magnetic recording head of claim 12, wherein said interlayer comprises $Al_2O_3$, $SiO_2$, and/or $Si_3N_4$.

15. The perpendicular magnetic recording head of claim 12, wherein said interlayer has a thickness in the range of about 5 angstroms to about 20 angstroms.

16. The perpendicular magnetic recording head of claim 12, wherein said first layer of material is magnetically exchanged coupled to said second layer of material through said interlayer.

17. A magnetic disc drive storage system, comprising:
a housing;
a perpendicular magnetic recording medium positioned in said housing;
a perpendicular magnetic recording head mounted in said housing adjacent said magnetic recording medium, said perpendicular magnetic recording head comprising:
a main write pole; and
a return pole magnetically coupled to said main write pole,
said main write pole comprising:
a first layer of material having a first saturation magnetic moment;
a second layer of material having a second saturation magnetic moment, said second saturation magnetic moment being greater than said first saturation magnetic moment; and
an interlayer positioned between said first layer of material and said second layer of material.

18. The system of claim 17, wherein said main write pole has a hard axis remanence in the range of about 0 to about 0.5.

19. The system of claim 17, wherein said interlayer comprises $Al_2O_3$, $SiO_2$, and/or $Si_3N_4$.

20. The system of claim 17, wherein said first layer of material is magnetically exchanged coupled to said second layer of material through said interlayer.

21. A magnetic pole structure, comprising:
a first layer of material having a first saturation magnetic moment;
a second layer of material having a second saturation magnetic moment, said second saturation magnetic moment being greater than said first saturation magnetic moment; and
an interlayer positioned between said first layer of material and said second layer of material.

22. The magnetic pole structure of claim 21, wherein said interlayer comprises $Al_2O_3$, $SiO_2$, and/or $Si_3N_4$.

23. The magnetic pole structure of claim 21, wherein said interlayer has a thickness in the range of about 5 angstroms to about 20 angstroms.

24. The magnetic pole structure of claim 21, wherein said interlayer is a non-magnetic material.

* * * * *

UNITED STATES PATENT AND TRADEMARK OFFICE
CERTIFICATE OF CORRECTION

PATENT NO. : 6,822,829 B2
DATED : November 23, 2004
INVENTOR(S) : Michael K. Minor and Timothy J. Klemmer It is certified that error appears in the above-identified patent and that said Letters Patent is hereby corrected as shown below:

<u>Title page,</u>
Item [75], Inventors, "Gibsonia, AZ" should read -- Gibsonia, PA --.

Signed and Sealed this

Seventh Day of February, 2006

JON W. DUDAS
*Director of the United States Patent and Trademark Office*